Oct. 8, 1929.  E. R. BURTNETT  1,731,227
INTERNAL COMBUSTION ENGINE
Filed March 25, 1926  3 Sheets-Sheet 1

INVENTOR
Everett R Burtnett

Oct. 8, 1929.　　　E. R. BURTNETT　　　1,731,227
INTERNAL COMBUSTION ENGINE
Filed March 25, 1926　　3 Sheets-Sheet 3

INVENTOR
Everett R. Burtnett

Patented Oct. 8, 1929

1,731,227

UNITED STATES PATENT OFFICE

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION

INTERNAL-COMBUSTION ENGINE

Application filed March 25, 1926. Serial No. 97,371.

My invention relates to internal combustion engines, and has for its principal object, the provision of a balanced valve for the single valvular function of fresh charge transfer from a charge pump cylinder chamber into a combustion cylinder chamber, with a separate piston valve provided for the function of fresh charge admission into the chamber of a fresh charge pump cylinder.

The object of my invention being to provide more flexible valve timing range relative to the respective purpose of admission of the charge to the pump chamber and the charge transfer facility and charge admission means into the combustion chamber, since a separate valve member for each function permits the use of two different timing arrangements relative to the rotary movement of the crank shaft.

A piston structure of conventional form provides as a valve member to the charge pump cylinder the desirable charge admission valve function to the charge pump and a valve of grooved face provides the desirable form for a charge transfer valve within the combustion chamber, since a valve of balanced external area exposed to internal pressure is neutral and not subject to pressure influences in any direction.

Another object is to enable the transfer valve within the combustion chamber, to be timed by a crank pin relatively timed rotatively, with the crank pin to which the piston within the combustion chamber is connected, so as to provide a transfer port opening duration until the piston within the combustion cylinder has reached a stroke position approximately one-half way through the headward sweep on the compression stroke, which permits of a 90° advance related charge pump piston crank pin position, thereby continuing the fresh charge super-charge induction into the combustion chamber after the exhaust ports are closed. The transfer valve being of balanced external area removes the necessity of the transfer valve crank pin being in any certain position when internal pressure is developed by combustion.

Figure 1:
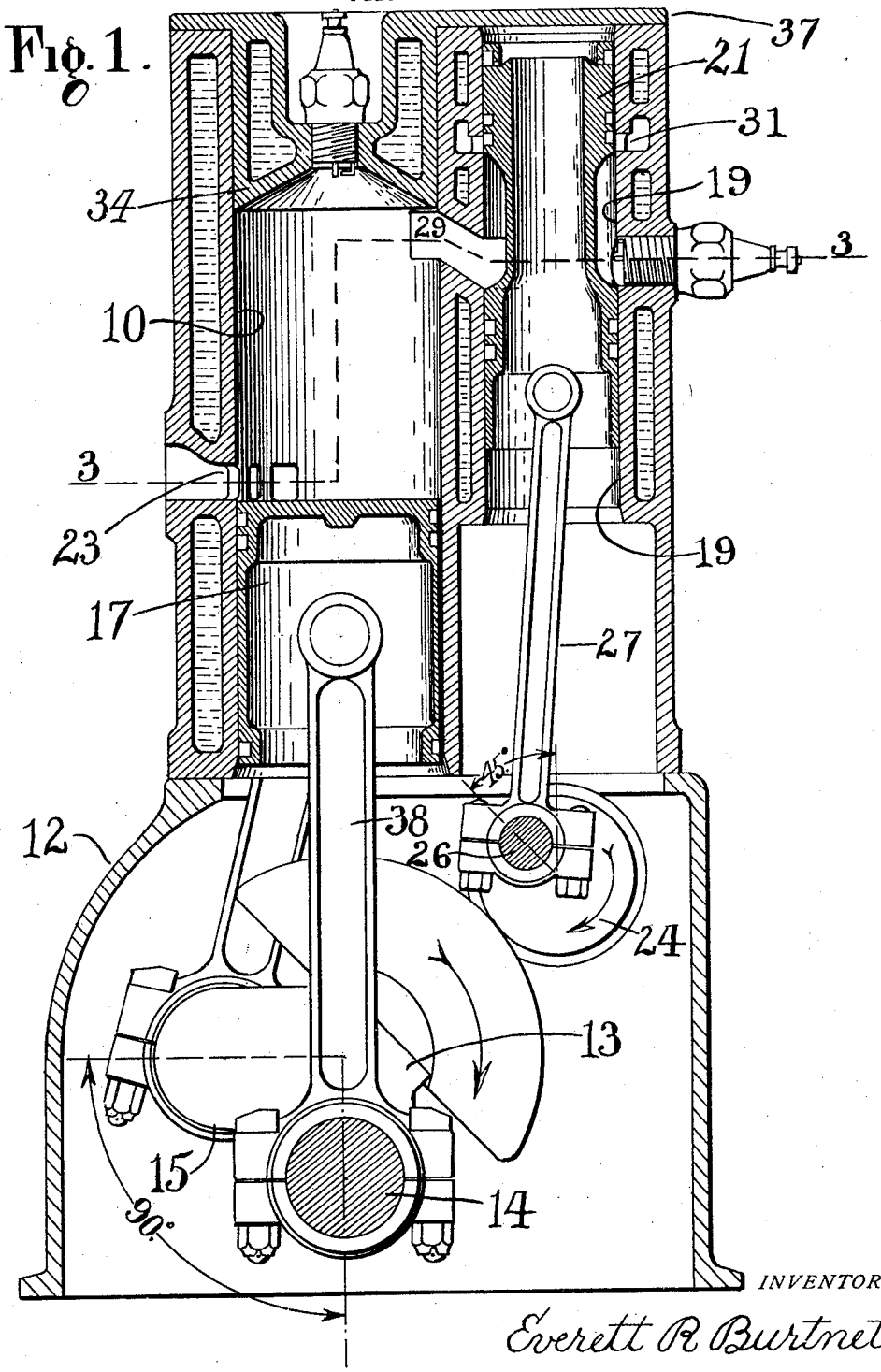
Fig. 1 is a vertical cross section taken through the center of the combustion chamber of my improved engine function unit and the balanced transfer valve cylinder that is directly associated therewith.
Figure 2:
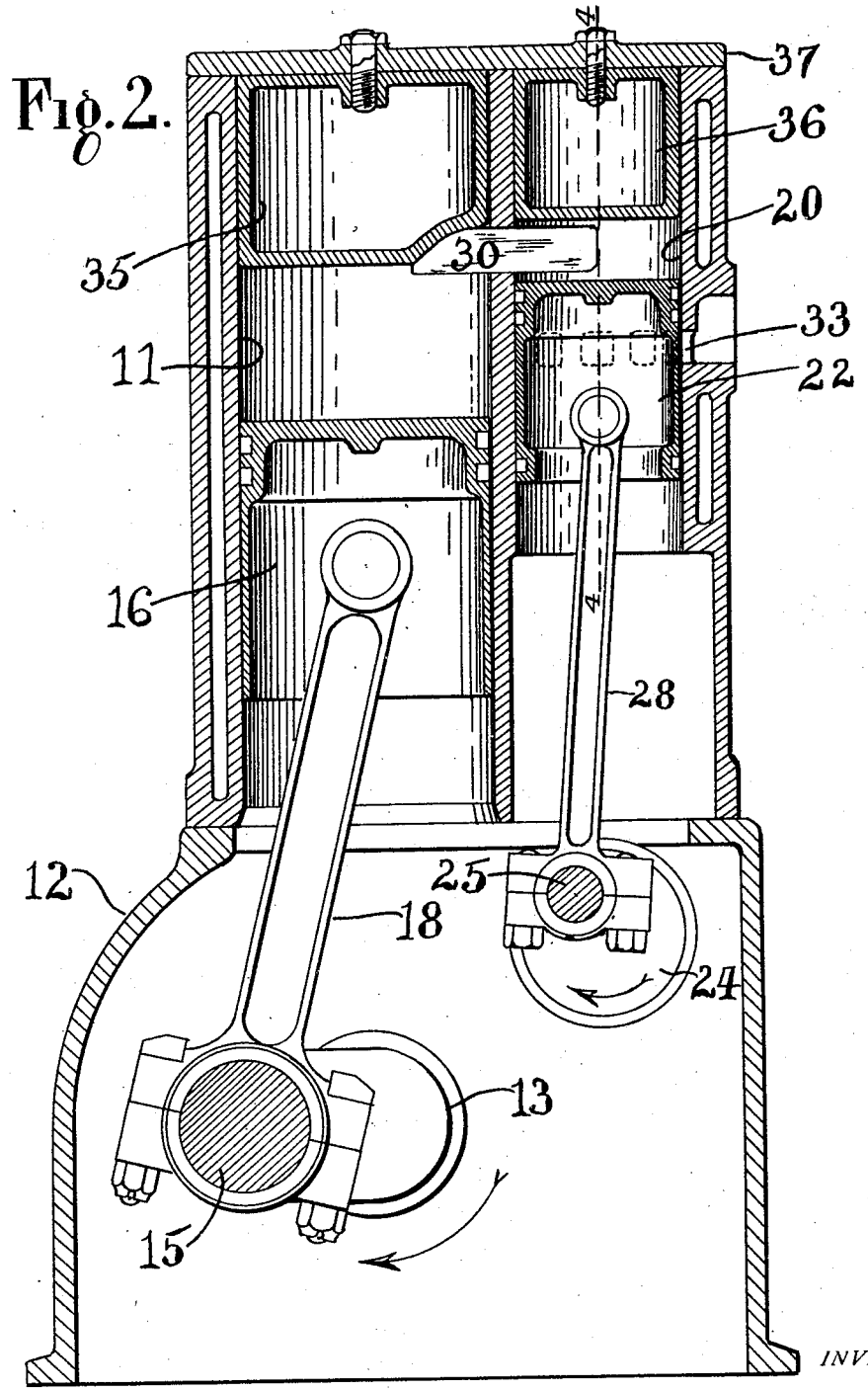
Fig. 2 is a vertical cross section taken through the center of the charge pumping cylinder and the associated piston valve structure.
Figure 3:
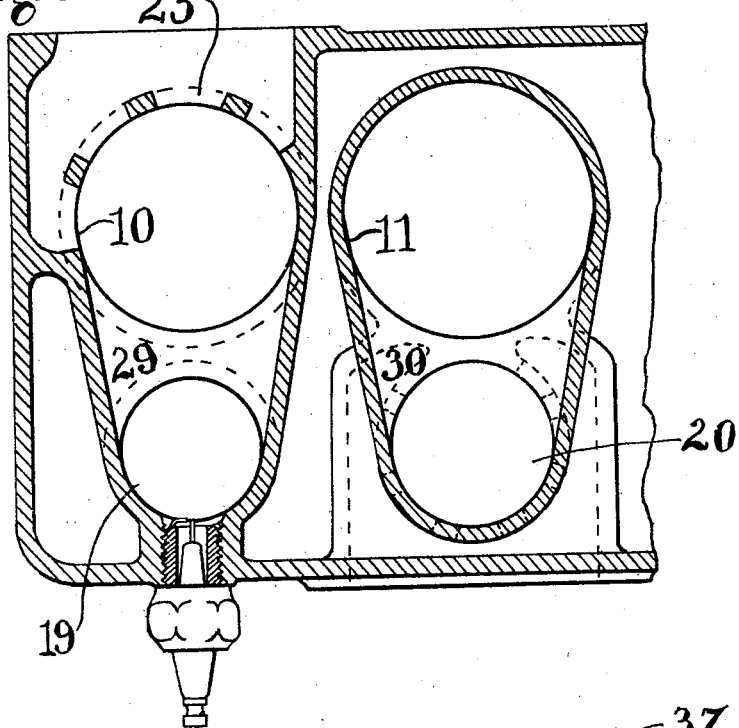
Fig. 3 is a horizontal section on the line 3—3 of Fig. 1.
Figure 4:
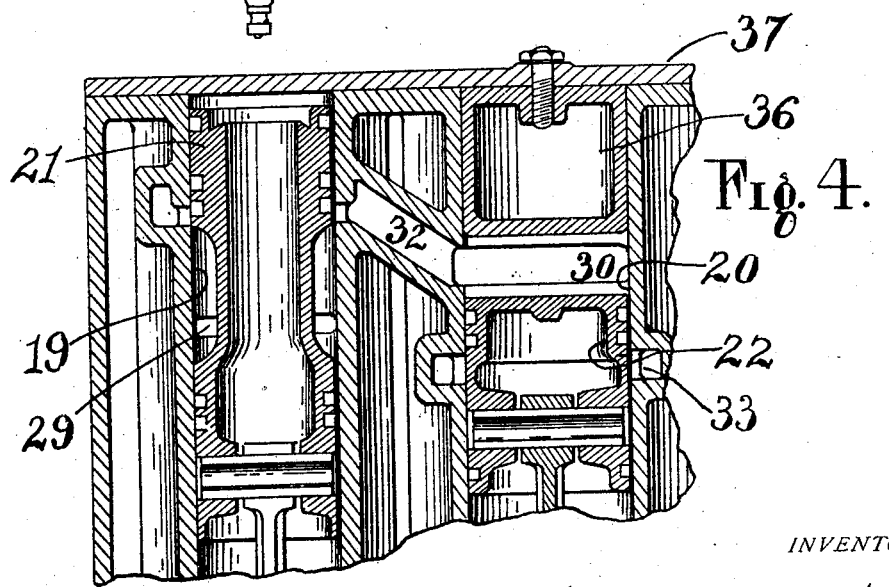
Fig. 4 is a vertical section taken lengthwise through the center of the valve structure on the cutting plane as indicated by line 4—4 of Fig. 2.

Referring by numerals to the accompanying drawings, which illustrate a practical embodiment of my invention, 10 designates the combustion cylinder and 11, the fresh charge pump cylinder, the same being separately or integrally formed and arranged side by side with their axes substantially parallel.

The cylinders 10 and 11 surmount a suitable crank case 12 and journalled in suitable bearings that are formed on said crank case is a shaft 13 having two cranks 14 and 15. These cranks are arranged relatively rotatively 90° apart, with crank 15 located in a plane of the axis of the charge pump cylinder 11 and with crank 14 located in a plane of the axis of the combustion cylinder 10.

A charge pumping piston 16 is arranged for reciprocatory movement within the charge pump cylinder 11 and a combustion chamber piston 17 is arranged for reciprocatory movement within the combustion cylinder 10. The charge pump piston 16 is connected by means of a conventional connecting rod 18 to the rotatively 90° advanced crank 15 of the crankshaft and the combustion chamber piston 17 is connected to the crank 14 of the crank shaft 13 by a connecting rod 38.

Arranged to the side of the cylinder 10 and preferably formed integral therewith, is a piston valve cylinder 19, of relatively small bore diameter and a similar valve cylinder 20 is arranged to the side of cylinder 11. Arranged for reciprocatory movement within the piston valve cylinder 19 is an annular grooved valve of balanced external area 21 and arranged for reciprocatory movement within the valve cylinder 20 is a piston valve 22.

Formed through the wall of cylinder 10 and at a point where they are wholly uncovered, only when the piston 17 is at crank end dead center of the stroke, is a series of exhaust ports 23.

A valve drive crank shaft 24 is suitably journalled in the crank case 12 with axis parallel the axis of the crank shaft 13. Crank pins 25 and 26 are formed of the crank shaft 24, the balanced grooved external area valve 21 within the valve cylinder 19 to the side of the combustion cylinder is attached to the crank pin 26 of the valve drive shaft by means of a connecting rod 27, the piston valve 22 within the valve cylinder 20 is attached to the crank pin 25 of the valve drive shaft 24. Crank pins may be provided of the main crank shaft 13 for the actuation of the said piston and balanced external area valve if desired, the use of an auxiliary valve drive shaft permits an engine of a multiple of units being constructed of less length of a given piston displacement than would be the case if the valves were directly connected to the main shaft.

Formed in the wall of the combustion cylinder 10 and at a position headward from the point reached by the head of the piston 17, within the combustion cylinder 10, when in the position of head end dead center is a pocket or recess 29 that connects and serves as a common passage communication between the chambers in the cylinders 10 and 19.

Formed in the wall of the charge pump cylinder 11 and at a position headward of the point reached by the head of the piston 16 within the charge pump cylinder 11, when at head end dead center, is a pocket or recess 30 which connects and serves as a passage communication between the chambers in the cylinders 11 and 20.

Formed through the wall of the cylinder 19 and at a point headward of the communicating passage 29 is a series of transfer ports 31, arranged in one plane as an annular series of ports. A duct 32 leads from the communicating passage 30 of the charge pump cylinder to the said transfer ports 31 and serves as a passage way for the fresh pumped charge to be transferred from the chamber of the pump cylinder 11 to the chamber of the combustion cylinder 10.

Formed through the wall of the valve cylinder 20 which is related to the charge pump cylinder 11, is a series of inlet ports 33, the said inlet ports 33 are adapted to the purpose of admission of fresh charge to the pump cylinder chamber.

The transfer ports 31 are located at a point relative to the reciprocatory movement of the grooved balanced external area valve 21, where they will be wholly uncovered only when the said valve is in a position of head end dead center and the inlet ports 33 are arranged at a point relative to the reciprocatory movement of the inlet piston valve 22, where they will be wholly uncovered only when the said inlet piston valve is in a position of crank end dead center.

Depending cylinder head plugs 34, 35 and 36 are secured to a common cylinder head 37. The head plug 34 depending into the combustion cylinder 10, the head plug 35 depending into the charge pump cylinder 11 and the head plug 36 depending into the valve cylinder 20. The object of the depending cylinder head plugs is to provide means of forming the clearance chambers to the charge pump and combustion cylinders in substantially the same horizontal plane relative to the axes of the cylinders and to minimize the content space of the respective cylinders into chambers of desirable clearance ratio to the respective piston sweep.

I preferably arrange two spark plugs to the combustion chamber, one to develop regular firing when the engine is operated at light load and located in the wall of the transfer valve cylinder where a small charge of fresh gaseous mixture will be stratified about the said spark plug and the second in the center of the cylinder head directly over the combustion cylinder and coincident with the axis of the said cylinder. The latter being for the complete combustion of the fresh charge when the engine is operated at full load.

The operation of my improved engine is as follows:

Assuming the combustion, charge pump pistons and the two valve pistons and their related crank pins are in the position as indicated in the drawings, the combustion piston 17 at crank end dead center, the exhaust ports are fully open, the charge pump piston 16 is one-half way through the sweep movement on the compression stroke, the transfer valve 21 in a position approaching head end dead center with the transfer valve crank pin 26, 45° before head end dead center and the inlet piston valve 22 approximately 40° before head end dead center, The exhaust ports will have been open for approximately 45°, the spent products of combustion will have been released during the time period of the said 45° of crank movement through the said exhaust ports, the pressure within the combustion chamber will be about atmospheric and the transfer ports 31 are on the moment of being opened, the inlet ports 33 to the pump cylinder are closed by the piston valve 22 and the headward stroke movement of the piston 16 within the charge pump cylinder 11 has developed a slight compression of the fresh charge entombed within the walls of the chamber between the head of the piston 16 and the face of the transfer valve 21, which to this point sealed the transfer ports 31.

The further movement of the cranks 14, 15, 25 and 26 for 45° will cause the four pistons to be moved to the following positions, the combustion piston 17 will move headwardly to a position relative to the movement of the crank 14, 45° away from crank end dead center and by this amount of stroke movement at the moment close the exhaust ports 23, the transfer valve 21 will be moved to a position of head end dead center by the movement of the valve crank 26 from 45° before to head end dead center and by this amount of stroke movement the said transfer valve will have wholly uncovered the said transfer ports 31, the charge pump piston 16 will have moved to an approximate head end dead center owing to the relative positions of the cranks 14 and 15, crank 15 being 90° in advance in the direction of rotation from crank 14 and the inlet piston valve will have been to a position substantially at head end dead center.

At this moment the scavenging function of the combustion chamber ends, since the exhaust ports closed and further exit of volume from the combustion chamber is prevented, it will be seen that the transfer valve will be closed by the further movement of the crank pin 26 through a rotary movement of 45°, also that the pump piston crank 15 is 45° short of completing its headward stroke, hence a further rotation of the cranks for 45° will develop a further forced induction of fresh charge from the charge pump cylinder 11 into the combustion chamber of the cylinder 10 and at the moment the piston 16 of the charge pump cylinder reaches head end dead center, the transfer ports 31 will be closed by the crank-ward movement of the transfer valve 21.

It will be understood that in permitting a passage communication to exist between the charge pump and combustion cylinders after the exhaust ports have been closed and with the further movement of the pistons within the charge pump and combustion cylinders headwardly, which decreases the total clearance space inter-connected by the passage communication existing by the continued opening of the transfer ports 31, that there will be a pressure rise in both the charge pump and combustion chambers, the pressure continuing to raise commonly until the transfer ports 31 are closed. The clearance space in the pump cylinder at this moment will be much less comparative to the clearance space of the combustion cylinder as a result of the charge pump piston crank 15 being 90° in advance of the combustion piston crank 14, therefore the transfer of fresh charge will continue as a superinduction, developing a super-charge of the combustion chamber to the moment the transfer ports 31 close.

In view of the fact that there will be an over atmospheric pressure in the clearance chamber of the pump cylinder at the time the transfer ports close and the piston of the pump cylinder is at the point of head end dead center, it will be found to advantage to lag the opening of the fresh charge inlet ports 33 a considerable time, relative to the crankward stroke movement of the charge pump piston after head end dead center, developing an atmospheric pressure or slight rarification in the pump chamber before the inlet port is opened and, passage communication is established between the pump chamber and the source of fresh charge supply.

An engine of my improved construction is comparatively simple, may be easily and cheaply produced, lends itself to high speed quantity production, is provided with strong, rugged, positively actuated and noiseless valvular arrangement for controlling the admission and transfer of fresh charge to the pump and combustion chambers, providing the necessary relative valve timing to accomplish a very great supercharging capacity between 90° crank pin related charge pump and combustion cylinders and piston movements.

It will be understood that minor changes in the size, form and construction of the various parts of my improved engine may be made and substituted for those herein described without departing from the spirit of the invention, the scope of which is set forth in the appended claims.

I claim as my invention:

1. In a two stroke cycle internal combustion engine, a power unit comprising a combustion cylinder, a pumping cylinder, a piston valve cylinder associated with the combustion cylinder, a piston valve cylinder associated with the pumping cylinder, the axes of all of said cylinders being parallel, a common cylinder head applied to said cylinders for closing all of the piston chambers therein, a cylinder head plug formed integral with said common head and depending into the combustion cylinder, head plugs detachably secured from the common cylinder head and depending into the pumping cylinder and the valve cylinder associated therewith, pistons arranged for operation within the combustion and pumping cylinder, a two throw crankshaft to which said pistons are connected, the two throws of said crankshaft being arranged 90° apart, a charge volume inlet piston valve arranged for operation within the valve cylinder associated with the pump, a duct leading from the inlet piston valve cylinder to the head end of the chamber within the pumping cylinder, a tubular piston arranged for operation within the valve cylinder associated with the combustion chamber, said tubular piston valve being provided with an externally arranged intermediate groove, a duct leading from the piston valve cylinder in which the tubular piston valve operates to the head end of the chamber in the combustion cylinder, and means for actuating the two piston valves in proper time relation to each other and to the reciprocations of the pistons in the combustion and pumping chambers.

2. In a two stroke cycle internal combustion engine, a combustion cylinder, a pumping cylinder, a piston valve cylinder associated with said combustion cylinder, a piston valve cylinder associated with the pumping cylinder, the axes of all of which cylinders are parallel, a detachable head for the four cylinders, a head plug formed integral with said detachable head and projecting into the chamber within the combustion cylinder, a head plug detachably connected to and depending from the cylinder head into the chamber within the pumping cylinder, and a head plug detachably connected to the cylinder head and depending into the piston valve chamber that is associated with the pumping cylinder.

3. In a two stroke cycle internal combustion engine, a combustion cylinder, a piston valve cylinder associated therewith, a piston arranged for operation within the combustion cylinder, a tubular transfer piston valve arranged for operation within the said piston valve cylinder, a pumping cylinder, a piston arranged for operation therein, a piston valve cylinder associated with said pump cylinder, a piston valve arranged for operation within the last mentioned piston valve cylinder, the axes of all of the cylinder being parallel, a common cylinder head for closing the upper ends of all of the cylinders, a head plug formed integral with said head plate and depending into the upper portion of the combustion cylinder, head plugs detachably connected to said head plate and depending into the upper portion of the pumping cylinder and the valve cylinder that is associated therewith, a two throw crankshaft to which the pistons in the combustion and pumping cylinders are connected, the two throws of said crankshaft being arranged 90° apart and means for reciprocating the two piston valves in proper time relation to each other and to the reciprocating movements of the pistons in the combustion and pumping cylinders.

In testimony whereof, I herewith affix my signature.

EVERETT R. BURTNETT.